(12) United States Patent
Zhao et al.

(10) Patent No.: US 10,827,390 B2
(45) Date of Patent: Nov. 3, 2020

(54) METHOD AND DEVICE FOR RESOURCE RESERVATION

(71) Applicant: CHINA ACADEMY OF TELECOMMUNICATIONS TECHNOLOGY, Beijing (CN)

(72) Inventors: Rui Zhao, Beijing (CN); Yuan Feng, Beijing (CN); Jiayi Fang, Beijing (CN); Yi Zhao, Beijing (CN); Haijun Zhou, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 16/322,067

(22) PCT Filed: Jul. 6, 2017

(86) PCT No.: PCT/CN2017/091933
§ 371 (c)(1),
(2) Date: Jan. 30, 2019

(87) PCT Pub. No.: WO2018/024072
PCT Pub. Date: Feb. 8, 2018

(65) Prior Publication Data
US 2019/0191337 A1    Jun. 20, 2019

(30) Foreign Application Priority Data
Aug. 1, 2016   (CN) .......................... 2016 1 0622379

(51) Int. Cl.
*H04W 4/00*      (2018.01)
*H04W 28/26*     (2009.01)
(Continued)

(52) U.S. Cl.
CPC ............. *H04W 28/26* (2013.01); *H04W 4/40* (2018.02); *H04W 72/0446* (2013.01); *H04W 72/0453* (2013.01); *H04W 72/1263* (2013.01)

(58) Field of Classification Search
CPC ...... H04W 72/04; H04W 88/08; H04W 76/00
See application file for complete search history.

(56) References Cited

U.S. PATENT DOCUMENTS

| 8,089,982 B1 * | 1/2012 | Vleugels | ............... H04L 12/403 370/447 |
| 2008/0177886 A1 * | 7/2008 | Singh | .................... H04W 28/26 709/228 |

(Continued)

FOREIGN PATENT DOCUMENTS

| CN | 104144501 A | 11/2014 |
| CN | 104184540 A | 12/2014 |

(Continued)

OTHER PUBLICATIONS

Communication, European Patent Office, dated May 19, 2015, 17836254.7-1215 / 3484204 PCT/CN2017091933, China Academy of Telecommunications Technology.

(Continued)

*Primary Examiner* — Siren Wei
(74) *Attorney, Agent, or Firm* — Flener IP & Business Law; Zareefa B. Flener; Ayhan E. Mertogul (57) ABSTRACT

A method and device for resource reservation are provided. The resource reservation method includes: receiving scheduling assignment information transmitted by first UE, where the scheduling assignment information includes information about time-frequency resource that the first UE needs to reserve; determining the quantity of reservations for the time-frequency resource by the first UE according to the scheduling assignment information; if new scheduling assignment information about the time-frequency resource (Continued)

transmitted by the first UE has been received before the quantity of reservations becomes invalid, re-determining reservation information for the time-frequency resource according to the new scheduling assignment information; and if no new scheduling assignment information about the time-frequency resource transmitted by the first UE has been received before the quantity of reservations becomes invalid, taking the time-frequency resource as an idle resource.

18 Claims, 5 Drawing Sheets

(51) Int. Cl.
  *H04W 4/40* (2018.01)
  *H04W 72/04* (2009.01)
  *H04W 72/12* (2009.01)

(56) References Cited

U.S. PATENT DOCUMENTS

| | | | |
|---|---|---|---|
| 2008/0273513 A1* | 11/2008 | Montojo | H04W 72/1273 370/342 |
| 2010/0150086 A1* | 6/2010 | Harada | H04W 56/0045 370/329 |
| 2013/0208549 A1 | 8/2013 | King | |
| 2013/0308549 A1* | 11/2013 | Madan | H04W 28/26 370/329 |
| 2014/0324974 A1 | 10/2014 | Park et al. | |
| 2015/0327288 A1 | 11/2015 | Park | |
| 2016/0338127 A1 | 11/2016 | Matsumoto et al. | |
| 2017/0019910 A1 | 1/2017 | Seo | |
| 2017/0135075 A1 | 5/2017 | Jiang et al. | |
| 2017/0280489 A1 | 9/2017 | Zhang et al. | |

FOREIGN PATENT DOCUMENTS

| | | |
|---|---|---|
| CN | 104427617 A | 3/2015 |
| CN | 105338633 A | 2/2016 |
| CN | 105517154 A | 4/2016 |
| WO | 2015115505 A1 | 8/2015 |
| WO | 2015130060 A1 | 9/2015 |
| WO | 2015172395 A1 | 11/2015 |

OTHER PUBLICATIONS

Communication, European Patent Office, dated Jun. 17, 2019, 17836254.7-1215 / 3484204, China Academy of Telecommunications Technology.

R1-160432, St Julian's, Malta, Feb. 15-19, 2016, Source: Intel Corporation, Title: Sensing Based Collision Avoidance Schemes for V2V Communication, Agenda Item: 7.3.2.2.1, Document for: Discussion and Decision.
R1-161049, St Julian's, Malta, Feb. 15-19, 2016, Source: NTT Docomo, Title: Discussion on Resource Control and Selection for PC5 Based V2V Communications, Agenda Item: 7.3.2.2.1, Document for: Discussion and Decision.
R1-163154, Busan, Korea, Apr. 11-15, 2016, Agenda Item: 7.3.2.2.2, Source: Beijing Xinwei Telecom Techn., Title: Discussion on V2V Semi-Persistent Scheduling Procedure, Document for: Discussion and Decision.
R1-164103, Nanjing, China, May 23-27, 2016, Agenda Item: 6.2.2.5, Source: Huawei, Hisilicon, Title: Discussion on Sci Contents for V2V, Document for: Discussion and Decision.
R1-164138, Nanjing, China, May 23-27, 2016, Source: Intel Corporation, Title: Discussion on Resource Reselection Triggers for V2V Communication, Agenda Item: 6.2.2.2.3, Document for: Discussion and Decision.
R1-164517, Nanjing, China May 23-27, 2016, Agenda Item: 6.2.2.5, Source: LG Electronics, Title: Discussion on Details of Scheduling Assignment for PC5 Based V2V, Document for: Discussion and Decision.
R1-164966, Nanjing, China May 23-27, 2016, Agenda Item: 6.2.2.5, Source: ZTE, Title: Discussion on SA Content, Document for: Discussion and Decision.
R1-165276, Busan, South Korea, Apr. 11-15, 2016, Source: Ericsson, Title: Discussion on V2X PC5 Scheduling, Resource Pools and Resource Patterns, Agenda Item: 6.2.2.2.2, Document for: Discussion and Decision.
Patent Cooperation Treaty, Written Opnion of the International Searching Authority, dated Sep. 6, 2017, PCT/CN2017/091933, China Academy of Telecommunications Technology.
First Office Action, The State Intellectual Property Office of Peoples Republic of China, 201610622379.9, China Academy of Telecommunications Technology, Resource Reservation Method and Device.
R1-143138, Dresden, Germany, Aug. 18-22, 2014, Source: ZTE, Title: SA and Data Resource Selection for D2D Communication Mode 2, Agenda Item: 7.2.3.1.1, Document for: Discussion.
Text of the Notification of the First Office Action, Subject: Patent Application No. 106124468.
Japanese Office Action, Notice of Reasons for Refusal, Application No. 2019-505176, Date of Drafting: Reiwa 1 Nov. 8, 2019, 8839 5J00.
3GPP TSG RAN WG1 Meeting #85, Nanjing, China, May 23-27, 2016, R1-165073, Source: Intel Corporation, Title: Discussion on Sensing Aspects to Support V2V Communication With Different Transmission Periodicity, Agenda Item: 6.2.2.2, Document for: Discussion and Decision.

\* cited by examiner

METHOD AND DEVICE FOR RESOURCE RESERVATION

CROSS-REFERENCE TO RELATED APPLICATION

This application is the U.S. national phase of PCT Application No. PCT/CN2017/091933 filed on Jul. 7, 2017, which claims a priority to Chinese Patent Application No. 201610622379.9 filed on Aug. 1, 2016, the disclosures of which are incorporated in their entirety by reference herein.

TECHNICAL FIELD

The present disclosure relates to the technical field of internet of vehicles, in particular to a method and device for resource reservation.

BACKGROUND

In the LTE (Long Term Evolution) system, the direct communication among vehicles is generally implemented in a semi-persistent resource occupation mode. An indication for resource occupied by data transmission is obtained by a transmitting UE (User Equipment) according to previously monitored scheduling assignment (SA) information, a subsequent resource occupation status is determined according to semi-persistent resource occupation principles, so as to select resources. In this mode, related parameters such as a duration and a period occupied by subsequent resources are usually carried in the SA information.

However, in the communication of the internet of vehicles, on one hand, the vehicle is in continuous motion, and the topology changes quickly. The transmitting UE that previously indicates to occupy the resource for a period of time may not be in a communication range due to a change of its location. If the reserved resource to be occupied cannot be reflected in the change of the resource occupation status in time, a false alarm of resource occupation may be caused, resulting in the waste of resources.

On the other hand, periodic transmissions of large packets and periodic transmissions of small packets are included in the communication of the internet of vehicles. The large package includes complete security certificate information, and its effective duration is currently considered to be 500 ms. The small packet may only contain signature information of the security certificate, and the signature information is effective only within a period of time (for example, 500 ms) upon receipt of the complete security certificate. For example, if the data is transmitted according to a period of 100 ms in the communication of the internet of vehicles, one large packet is transmitted first and then four small packets are transmitted in the data transmission. In this case, the transmission periods of the large packet and the small packet are actually different, the transmission period of the large packet is 500 ms, the transmission period of the small packet is 100 ms, and time-frequency resource occupied by the data transmission of the large packet is different from that occupied by the data transmission of the small packet.

Figure 1:
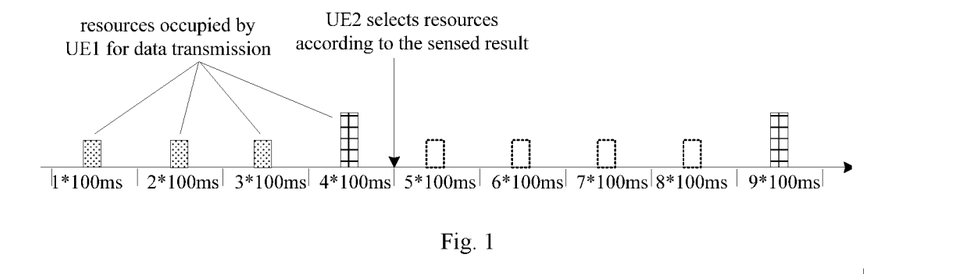
FIG. 1 is a schematic diagram of reserving resources in the related art.

As shown in FIG. 1, in a case that SA (Scheduling assignment) information of a small packet is received by a UE2 within the previous 100 ms, a resource reservation period of the small packet is 100 ms, SA information of a large packet is received within the current 100 ms, a resource reservation period of the large packet tis 500 ms, and both data packets are transmitted by UE1, by sensing the resource occupation status, it may be considered by UE2 that the subsequent resource occupation status is determined according to the indication in the SA information of the large packet, and the resource reservation period is 500 ms. In this way, the resource reservation information about the small packet transmission may be lost (such as resources indicated by the dotted frame in FIG. 1), which may cause UE2 to misjudge the resource occupation status, resulting in resource conflicts.

SUMMARY

In view of the above, a method and a device for resource reservation are provided according to the present disclosure, so as to address issues of the false alarm and misjudgment of resource reservation occupation among vehicles, to improve the efficiency of resource allocation.

In order to address the above issue, in a first aspect, a method for resource reservation is provided according to the present disclosure, which includes:

receiving scheduling assignment information transmitted by first user equipment (UE), where the scheduling assignment information includes information about a time-frequency resource that the first UE requires to reserve;

determining the quantity of reservations for the time-frequency resource by the first UE according to the scheduling assignment information;

re-determining reservation information for the time-frequency resource according to new scheduling assignment information, if the new scheduling assignment information about the time-frequency resource transmitted by the first UE has been received before the quantity of reservations becomes invalid; and taking the time-frequency resource as an idle resource, if no new scheduling assignment information about the time-frequency resource transmitted by the first UE has been received before the quantity of reservations becomes invalid.

The scheduling assignment information further includes: an occupation period for the time-frequency resource; or the scheduling assignment information further includes: the current remaining actual quantity of the time-frequency resource being persistently occupied; or the scheduling assignment information further includes: the current remaining actual quantity of the time-frequency resource being persistently occupied, and an occupation period for the time-frequency resource; or the scheduling assignment information further includes: the current remaining valid quantity of the time-frequency resource being persistently occupied, and an occupation period for the time-frequency resource.

The determining the quantity of reservations for the time-frequency resource by the first user equipment according to the scheduling assignment information includes:

determining the preset maximum valid quantity of the time-frequency resource according to the scheduling assignment information, and taking the maximum valid quantity of the time-frequency resource as the quantity of reservations, where the maximum valid quantity of the time-frequency resource is an integer greater than 1.

The determining the quantity of reservations for the time-frequency resource by the first user equipment according to the scheduling assignment information includes:

determining the preset maximum valid quantity of the time-frequency resource according to the scheduling assignment information; and determining the smaller one of the maximum valid quantity of the time-frequency resource and the current remaining actual quantity of the time-frequency resource being persistently occupied as the quantity of reservations of the time-frequency resource, where the maximum valid quantity of the time-frequency resource is an integer greater than 1.

The determining the quantity of reservations for the time-frequency resource by the first user equipment according to the scheduling assignment information includes:

taking the current remaining valid quantity of the time-frequency resource being persistently occupied as the quantity of reservations of the time-frequency resource, where the current remaining valid quantity of the time-frequency resource being persistently occupied is the smaller one of the preset maximum valid quantity of the time-frequency resource and the current remaining actual quantity of the time-frequency resource being persistently occupied that is determined by the first UE, and the preset maximum valid quantity of the time-frequency resource is an integer greater than 1.

If no new scheduling assignment information about the time-frequency resource transmitted by the first user equipment has been received before the quantity of reservations becomes invalid, taking the time-frequency resource as an idle resource, specifically includes:

taking the time-frequency resource as the idle resource, if the quantity of the new scheduling assignment information about the time-frequency resource transmitted by the first UE being not received successively reaches the quantity of reservations.

The information about time-frequency resource that the information about time-frequency resource that the first UE requires to reserve includes location information about the time-frequency resource.

A received power of the scheduling assignment information and a received power of the new scheduling assignment information are greater than or equal to a preset value.

In a second aspect, a method for resource reservation is provided according to the present disclosure, which includes:

transmitting scheduling assignment information to second UE, where the scheduling assignment information includes information about a time-frequency resource to be reserved; and transmitting new scheduling assignment information about the time-frequency resource to the second UE, in a case that the time-frequency resource requires to continue to be reserved.

The scheduling assignment information further includes: an occupation period for the time-frequency resource; or the scheduling assignment information further includes: the current remaining actual quantity of the time-frequency resource being persistently occupied; or the scheduling assignment information further includes: the current remaining actual quantity of the time-frequency resource being persistently occupied, and an occupation period for the time-frequency resource; or the scheduling assignment information further includes: the current remaining valid quantity of the time-frequency resource being persistently occupied, and an occupation period for the time-frequency resource.

The current remaining actual quantity of the time-frequency resource being persistently occupied decreases as the quantity of data transmission through the time-frequency resource increases.

The current remaining valid quantity of the time-frequency resource being persistently occupied is the smaller one of the current remaining actual quantity of the time-frequency resource being persistently occupied and the preset maximum valid quantity of the time-frequency resource, and the preset maximum valid quantity of the time-frequency resource is an integer greater than 1.

In a third aspect, a device for resource reservation is further provided according to the present disclosure, which includes:

a receiving module, configured to receive scheduling assignment information transmitted by first UE, where the scheduling assignment information includes information about a time-frequency resource that the first UE requires to reserve;

a determining module, configured to determine the quantity of reservations for the time-frequency resource by the first UE according to the scheduling assignment information;

a first processing module, configured to re-determine reservation information for the time-frequency resource according to new scheduling assignment information, if the new scheduling assignment information about the time-frequency resource transmitted by the first UE has been received before the quantity of reservations becomes invalid; and a second processing module, configured to take the time-frequency resource as an idle resource, if no new scheduling assignment information about the time-frequency resource transmitted by the first UE has been received before the quantity of reservations becomes invalid.

The scheduling assignment information further includes: an occupation period for the time-frequency resource; or the scheduling assignment information further includes: the current remaining actual quantity of the time-frequency resource being persistently occupied; or the scheduling assignment information further includes: the current remaining actual quantity of the time-frequency resource being persistently occupied, and an occupation period for the time-frequency resource; or the scheduling assignment information further includes: the current remaining valid quantity of the time-frequency resource being persistently occupied, and an occupation period for the time-frequency resource.

The determining module is specifically configured to:

determine the preset maximum valid quantity of the time-frequency resource according to the scheduling assignment information, and take the maximum valid quantity of the time-frequency resource as the quantity of reservations, where the maximum valid quantity of the time-frequency resource is an integer greater than 1.

The determining module includes:

a first determining sub-module, configured to determine the preset maximum valid quantity of the time-frequency resource according to the scheduling assignment information; and a second determining sub-module, configured to determine the smaller one of the maximum valid quantity of the time-frequency resource and the current remaining actual quantity of the time-frequency resource being persistently occupied as the quantity of reservations of the time-frequency resource, where the maximum valid quantity of the time-frequency resource is an integer greater than 1.

The determining module is specifically configured to:

take the current remaining valid quantity of the time-frequency resource being persistently occupied as the quantity of reservations of the time-frequency resource, where the current remaining valid quantity of the time-frequency resource being persistently occupied is the smaller one of the preset maximum valid quantity of the time-frequency resource and the current remaining actual quantity of the time-frequency resource being persistently occupied that is determined by the first UE, and the preset maximum valid quantity of the time-frequency resource is an integer greater than 1.

The second processing module is specifically configured to take the time-frequency resource as the idle resource, if the quantity of the new scheduling assignment information about the time-frequency resource transmitted by the first UE being not received successively reaches the quantity of reservations.

The information about time-frequency resource that the first UE requires to reserve includes location information about the time-frequency resource; and a received power of the scheduling assignment information and a received power of the new scheduling assignment information are greater than or equal to a preset value.

In a fourth aspect, a device for resource reservation is further provided according to the present disclosure, which includes:

a first information transmitting module, configured to transmit scheduling assignment information to second UE, where the scheduling assignment information includes information about a time-frequency resource to be reserved; and a second information transmitting module, configured to transmit new scheduling assignment information about the time-frequency resource to the second UE, when the time-frequency resource requires to continue to be reserved.

The device further includes: an information determining module, configured to determine content included in the scheduling assignment information.

The scheduling assignment information further includes: an occupation period for the time-frequency resource; or the scheduling assignment information further includes: the current remaining actual quantity of the time-frequency resource being persistently occupied; or the scheduling assignment information further includes: the current remaining actual quantity of the time-frequency resource being persistently occupied, and an occupation period for the time-frequency resource; or the scheduling assignment information further includes: the current remaining valid quantity of the time-frequency resource being persistently occupied, and an occupation period for the time-frequency resource.

The current remaining actual quantity of the time-frequency resource being persistently occupied decreases as the quantity of data transmission through the time-frequency resource increases.

In determining the current remaining valid quantity of the time-frequency resource being persistently occupied, the information determining module is specifically configured to:

take the smaller one of the current remaining actual quantity of the time-frequency resource being persistently occupied and the preset maximum valid quantity of the time-frequency resource as the current remaining valid quantity of the time-frequency resource being persistently occupied, where the preset maximum valid quantity of the time-frequency resource is an integer greater than 1.

In a fifth aspect, a device for resource reservation is further provided according to the present disclosure, which includes a receiver, a processor, and a memory for storing data used by the processor in performing operations.

The receiver is configured to receive scheduling assignment information transmitted by first user equipment, where the scheduling assignment information includes information about a time-frequency resource that the first user equipment needs to reserve.

The processor is configured to determine the quantity of reservations for the time-frequency resource by the first user equipment according to the scheduling assignment information received by the receiver; if new scheduling assignment information about the time-frequency resource transmitted by the first user equipment has been received before the quantity of reservations becomes invalid, re-determine reservation information for the time-frequency resource according to the new scheduling assignment information; if no new scheduling assignment information about the time-frequency resource transmitted by the first user equipment has been received before the quantity of reservations becomes invalid, take the time-frequency resource as an idle resource.

In a sixth aspect, a device for resource reservation is further provided according to the present disclosure, which includes a transmitter, a processor, and a memory for storing data used by the processor in performing operations.

The transmitter is configured to transmit scheduling assignment information to second user equipment, the scheduling assignment information including information about a time-frequency resource to be reserved; and transmit new scheduling assignment information about the time-frequency resource to the second user equipment, when it is determined by the processor that the time-frequency resource requires to continue to be reserved.

The above-described technical solutions of the present disclosure have beneficial effects as follows.

In the embodiments of the present disclosure, after receiving the scheduling assignment information of the first user equipment, the second user equipment determines the quantity of reservations for the time-frequency resource by the first user equipment according to the scheduling assignment information, and determines whether the time-frequency resource reserved by the first user equipment may be utilized according to whether the new scheduling assignment information of the first user equipment is received before the quantity of reservations becomes invalid. Therefore, with the solutions in the embodiments of the present disclosure, the status of the reserved resource occupied by the first user equipment can be known in time, so that the reserved resource is processed correspondingly, thereby avoiding the false alarm and misjudgment of the reserved resource, and improving the efficiency of resource allocation.

DETAILED DESCRIPTION

Hereinafter, particular embodiments of the present disclosure are described in detail in conjunction with the drawings and embodiments. The following embodiments are used to illustrate the present disclosure, but not intended to limit the scope of the present disclosure.

At present, the LTE-based V2V (vehicle to vehicle) technology is improved based on a manner of LTE D2D (Device to Device, LTE Direct). Control information (Scheduling Assignment, SA) and data information (Data) are transmitted through different channels. A receiver first detects the SA information carried in the control information, and then receives the data information according to the received control information.

In the LTE-based V2V technology, there are two modes of selecting resources, which are a mode of UE spontaneously selecting resources and a base station-assisted resource selection mode.

In the base station-assisted resource selection mode, in a case that the vehicle is within a network coverage, the base station may schedule the V2V communication through the downlink control channel (Physical Downlink Control Channel (PDCCH), and Enhanced Physical Downlink Control Channel (EPDCCH)). In this case, the base station instructs the transmitting vehicle to transmit resource locations of the SA information and the data information by transmitting a V2V grant message.

In the mode of UE spontaneously selecting resources, UE needs to sense a resource occupation status, and perform resource selection. Generally, there are two ways: one is to know an indication for resources occupied by other UEs for data transmission according to received SA information of the other UEs, and select resources for transmission in the unoccupied data resources; the other one is to directly detect energy of resources for the data transmission, and determine the corresponding data resource as a occupied resource, if the energy of the corresponding data resource is higher than a threshold. On this basis, the unoccupied data resource is selected for data transmission. In the first way, if the data transmission is in the same subframe as the transmission of the associated SA, UE requires to determine whether the resource is occupied in the subsequent period of time according to the current sense. Therefore, there is a need to know a duration or a period during which the resource is occupied persistently for the data transmission, so as to determine an occupation status of data resources in the coming period of time. Similarly, for the energy detection based on data resources, there is also a need to know the duration or period during which the resource is occupied persistently for the data transmission, so as to determine an occupation status of data resources in the coming period of time.

Figure 2:
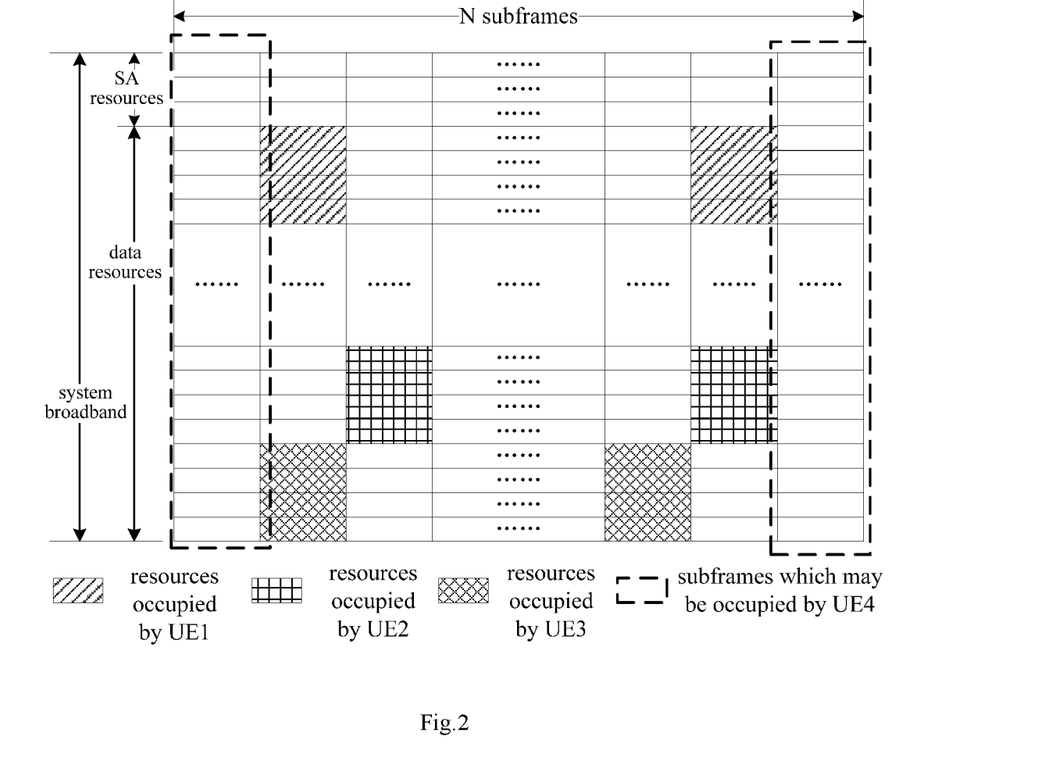
FIG. 2 is a schematic diagram of selecting resources in the related art.

Briefly, as shown in FIG. 2, UE needs to construct the resource occupation status of N subframes in the future according to the energy detection or the SA detection, and the duration or the period during which the resource is occupied persistently for the data transmission, and the idle resources in a frequency domain is selected for transmission in the N subframes in the future. The data resource occupation status for UE1, UE2, and UE3 is identified in FIG. 2. If UE4 needs to perform data transmission, UE4 may select a resource among the idle resources. Optionally, the subframe on which the interference is the smallest may be further known in an energy detection manner, and the subframe with the smallest interference is selected. In FIG. 2, UE4 may select the first subframe and the last subframe to transmit the data resources.

Figure 3:
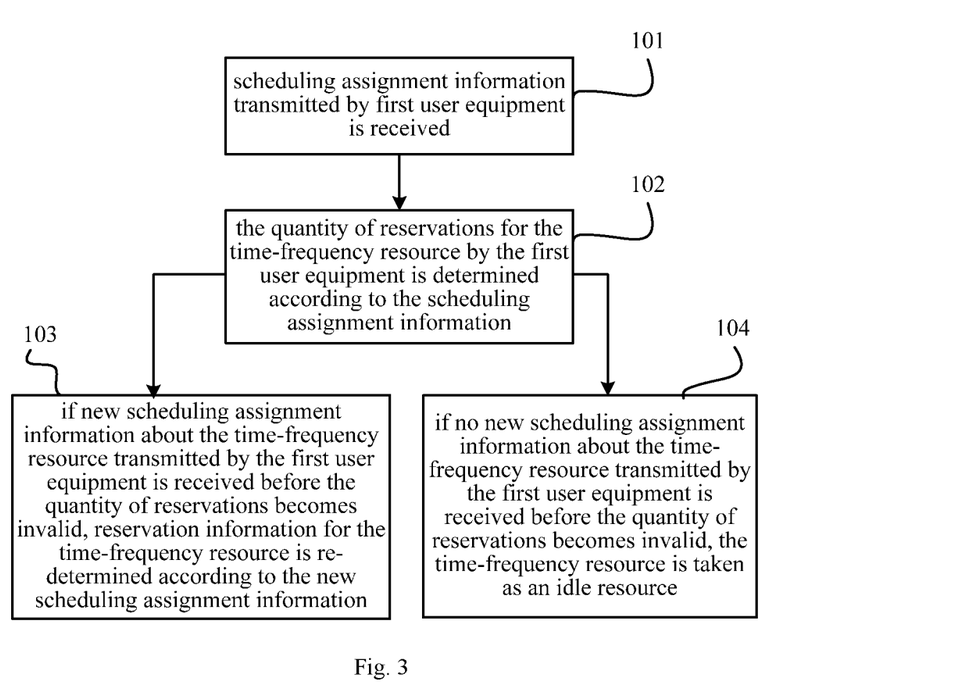
FIG. 3 is a flowchart of a method for resource reservation according to a first embodiment of the present disclosure.

As shown in FIG. 3, a method for resource reservation is provided according to a first embodiment of the present disclosure, which is applicable to second user equipment. The method includes the following steps 101 to 104.

In step 101, scheduling assignment information transmitted by first user equipment is received.

Herein, the first user equipment refers to user equipment that transmits the scheduling assignment information. Second user equipment hereinafter is used to represent user equipment for receiving the scheduling assignment information.

In a specific application, the information included in the scheduling assignment information may include the following cases:

(1) information about a time-frequency resource that the first user equipment needs to reserve;

(2) information about the time-frequency resource that the first user equipment needs to reserve, and an occupation period for the time-frequency resource;

(3) information about the time-frequency resource that the first user equipment needs to reserve, and the current remaining actual quantity of the time-frequency resource being persistently occupied;

(4) information about the time-frequency resource that the first user equipment needs to reserve, an occupation period for the time-frequency resource, and the current remaining actual quantity of the time-frequency resource being persistently occupied; and (5) information about the time-frequency resource that the first user equipment needs to reserve, the current remaining valid quantity of the time-frequency resource being persistently occupied, and an occupation period for the time-frequency resource.

The information about the time-frequency resource that the first user equipment needs to reserve includes location information of the time-frequency resource.

In step 102, the quantity of reservations for the time-frequency resource by the first user equipment is determined according to the scheduling assignment information.

With respect to the scheduling assignment information including different content in step 101, the quantity of reservations for the time-frequency resource by the first user equipment may be determined in different ways in the embodiments of the present disclosure.

With respect to cases (1) and (2) in step 101, in a specific application, the second user equipment determines the preset maximum valid quantity of the time-frequency resource according to the scheduling assignment information, and takes the maximum valid quantity of the time-frequency resource as the quantity of reservations. The maximum valid quantity of the time-frequency resource is an integer greater than 1.

In case (1), the preset maximum valid quantity of the time-frequency resource is equal to a quotient of the preset maximum valid duration of the time-frequency resource to the preset occupation period for the time-frequency resource; while in case (2), the preset maximum valid quantity of the time-frequency resource is equal to a quotient of the preset maximum valid duration of the time-frequency resource to the occupation period for the time-frequency resource included in the scheduling assignment information.

With respect to cases (3) and (4) in step 101, in a specific application, the second user equipment determines the preset maximum valid quantity of the time-frequency resource according to the scheduling assignment information, and determines the smaller one of the maximum valid quantity of the time-frequency resource and the current remaining actual quantity of the time-frequency resource being persistently occupied as the quantity of reservations of the time-frequency resource. The maximum valid quantity of the time-frequency resource is an integer greater than 1.

In case (3), the preset maximum valid quantity of the time-frequency resource is equal to a quotient of the preset maximum valid duration of the time-frequency resource to the preset occupation period for the time-frequency resource; while in case (4), the preset maximum valid quantity of the time-frequency resource is equal to a quotient of the preset maximum valid duration of the time-frequency resource to the occupation period for the time-frequency resource included in the scheduling assignment information.

With respect to case (5) in step 101, in a specific application, the second user equipment determines the current remaining valid quantity of the time-frequency resource being persistently occupied as the quantity of reservations of the time-frequency resource. The current remaining valid quantity of the time-frequency resource being persistently occupied is the smaller one of the preset maximum valid quantity of the time-frequency resource and the current remaining actual quantity of the time-frequency resource being persistently occupied which is determined by the first user equipment.

In the above description, the current remaining actual quantity of the time-frequency resource being persistently occupied is equal to a quotient of the current remaining actual duration of the time-frequency resource being persistently occupied to the occupation period for the time-frequency resource.

In step 103, if new scheduling assignment information about the time-frequency resource transmitted by the first user equipment has been received before the quantity of reservations becomes invalid, reservation information for the time-frequency resource is re-determined according to the new scheduling assignment information.

In step 104, if no new scheduling assignment information about the time-frequency resource transmitted by the first user equipment has been received before the quantity of reservations becomes invalid, the time-frequency resource is taken as an idle resource.

In a specific application, the scheduling assignment information has a validity period, and the validity period may be represented by the quantity of reservations. Since the quantity of reservations may be converted into a reservation duration, the validity period may be represented by the reservation duration.

The quantity of reservations is used to measure the quantity of no new scheduling assignment information being received successively by the second user equipment after step 101. The "the quantity of reservations becomes invalid" means that the quantity of no new scheduling assignment information being received successively by the second user equipment reaches the quantity of reservations.

Specifically, in this step, if the quantity of no new scheduling assignment information about the time-frequency resource transmitted by the first user equipment being received successively reaches the quantity of reservations, the quantity of reservations becomes invalid, and the time-frequency resource is taken as an idle resource. Otherwise, the reservation information for the time-frequency resource is re-determined according to the new scheduling assignment information.

As can be seen from the above, in the embodiment of the present disclosure, after receiving the scheduling assignment information from the first user equipment, the second user equipment determines the quantity of reservations for the time-frequency resource by the first user equipment according to the scheduling assignment information, and determines whether the time-frequency resource reserved by the first user equipment may be utilized according to whether the new scheduling assignment information from the first user equipment is received before the quantity of reservations becomes invalid. Therefore, with the solutions in the embodiments of the present disclosure, the status of the reserved resources occupied by the first user equipment may be known in time, so as to process the reserved resources correspondingly, thereby avoiding the false alarm and misjudgment of the reserved resources, and improving the efficiency of resource allocation.

Figure 4:
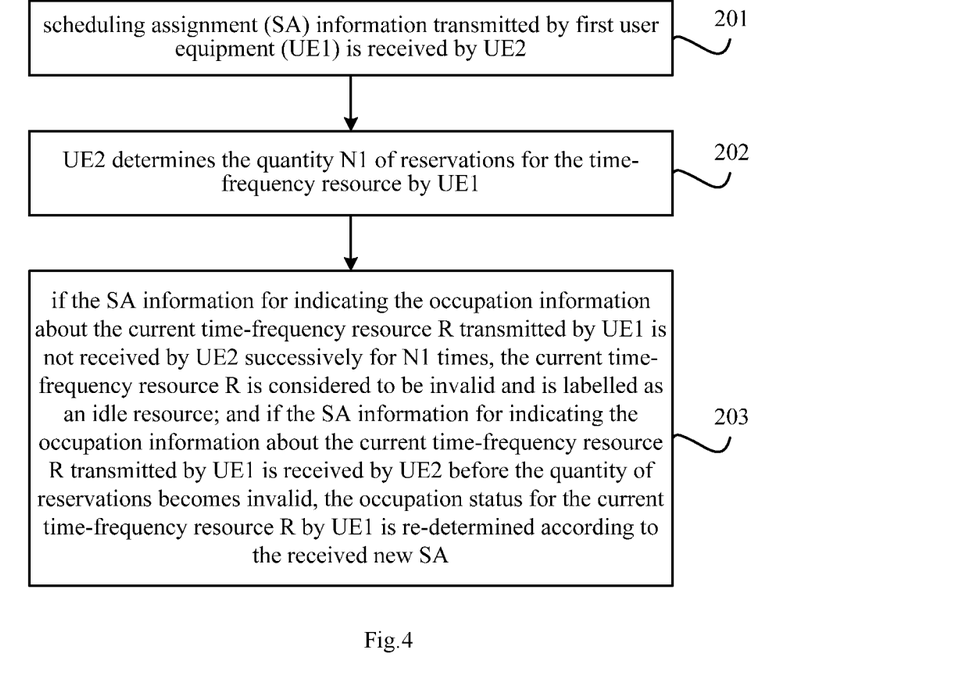
FIG. 4 is a flowchart of a method for resource reservation according to a second embodiment of the present disclosure.

As shown in FIG. 4, a method for resource reservation is provided according to a second embodiment of the present disclosure, which is applicable to second user equipment (UE2), and includes the following steps 201 to 203.

In step 201, scheduling assignment (SA) information transmitted by first user equipment (UE1) is received by UE2.

It is assumed that UE2 receives the SA information from UE1 at time t1. The information included in the SA information transmitted by UE1 may include the following modes:

(1) location information R of the time-frequency resource;

(2) location information R of the time-frequency resource, and an indication T_p of the occupation period for the time-frequency resource;

(3) location information R of the time-frequency resource, and the current remaining actual quantity N2 of the time-frequency resource being persistently occupied;

(4) location information R of the time-frequency resource, an indication T_p of the occupation period for the time-frequency resource, and the current remaining actual quantity N2 of the time-frequency resource being persistently occupied; where every time when UE1 occupies the current reserved time-frequency resource R for data transmission, the quantity N2 is decremented by one, and an initial value of N2 is determined when UE1 initially allocates the time-frequency resource R; and (5) location information R of the time-frequency resource, an indication T_p of the occupation period for the time-frequency resource, and the current remaining valid quantity N4 of the time-frequency resource being persistently occupied.

In determining the value of N4, UE1 needs to consider the current remaining actual quantity N2 of the time-frequency resources being persistently occupied and the maximum valid quantity N3 of the time-frequency resource considered by the receiving terminal UE2. N4=min(N2, N3), where N3>=2. The main benefit of the method in such way is that signaling overhead may be saved.

In the foregoing process, UE2 may determine the maximum valid quantity N3 of the time-frequency resource or the maximum valid duration T3 of the time-frequency resource in advance or according to a configuration, where T3=T_p*N3.

In the foregoing process, when initially occupying the time-frequency resource R, UE1 needs to determine the initial value of the duration T2 of the time-frequency resource R being persistently occupied or the quantity N2 of the time-frequency resource R being persistently occupied, where T2=T_p*N2. Once UE1 occupies the current reserved time-frequency resource R to transmit data every time, the quantity N2 is decremented by one. When N2 is decremented to 0, resources are reselected.

Herein, the current remaining actual quantity of the time-frequency resource being persistently occupied may include the current quantity of transmissions, or may not include the current quantity of transmissions. Only difference is that, if the current quantity of transmissions is included, the current remaining actual quantity of the time-frequency resource being persistently occupied is one more than the current remaining actual quantity of the time-frequency resource being persistently occupied in a case that the current quantity of transmissions is not included. The case that the current quantity of transmissions is not included is taken as an example in the description of the embodiments of the present disclosure.

In step 202, UE2 determines the quantity N1 of reservations for the time-frequency resource by UE1.

With respect to modes (1) and (2), UE2 acquires the preset maximum valid quantity N3 of the time-frequency resource, and determines the maximum valid quantity of the time-frequency resource as the quantity of reservations. The maximum valid quantity of the time-frequency resource is an integer of 2 or more. That is, N1=N3 herein.

With respect to modes (3) and (4), UE2 acquires the preset maximum valid quantity N3 of the time-frequency resource, and determines the smaller one of the maximum valid quantity N3 of the time-frequency resource and the current remaining actual quantity N2 of the time-frequency resource being persistently occupied as the quantity of reservations. That is, N1=min (N2, N3) herein.

With respect to mode (5), UE2 determines the current remaining valid quantity of the time-frequency resource being persistently occupied as the quantity of reservations. That is, N1=N4, N4=min (N2, N3), where N3>=2 herein.

In step 203, if the SA information for indicating the occupation information about the current time-frequency resource R transmitted by UE1 is not received by UE2 successively for N1 times, the current time-frequency resource R is considered to be invalid and is labelled as an idle resource; and if the SA information for indicating the occupation information about the current time-frequency resource R transmitted by UE1 is received by UE2 before the quantity of reservations becomes invalid, the occupation status for the current time-frequency resource R by UE1 is re-determined according to the received new SA.

Further, in the foregoing process, some conditions need to be met for whether the SA information from UE1 (whether the SA information in step 201 or the new SA information in step 202) received by UE2 is capable to reserve the subsequent resource. For example, the received power of the SA information from UE1 received by UE2 needs to be higher than a threshold, which may be set as a matter of experience.

As can be seen from the above, in the embodiment of the present disclosure, after receiving the scheduling assignment information of the first user equipment, the second user equipment determines the quantity of reservations for the time-frequency resource by the first user equipment according to the scheduling assignment information, and determines whether the time-frequency resource reserved by the first user equipment may be utilized according to whether the new scheduling assignment information of the first user equipment is received before the quantity of reservations becomes invalid. Therefore, with the solutions in the embodiments of the present disclosure, the status of the reserved resources occupied by the first user equipment can be known in time, so that the reserved resources are processed correspondingly, thereby avoiding the false alarm and misjudgment of the reserved resources, and improving the efficiency of resource allocation.

Figure 5:
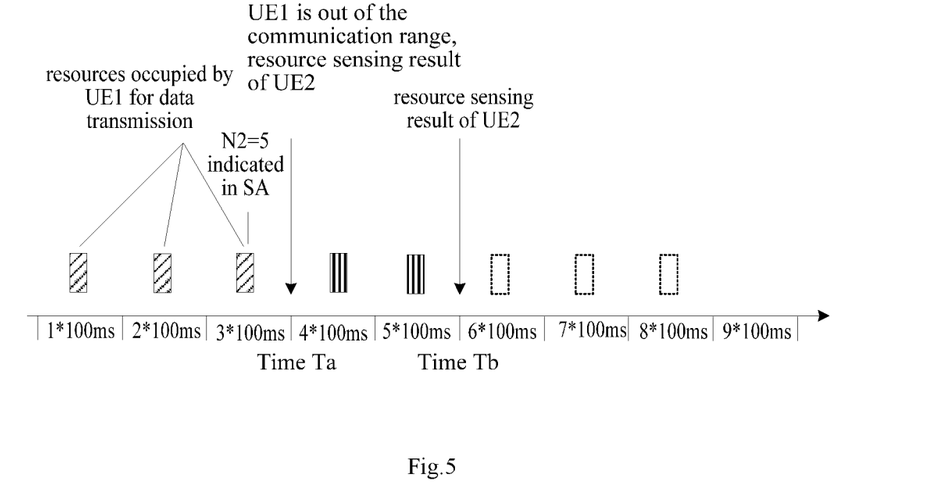
FIG. 5 to FIG. 8 each is a schematic diagram of reserving resources using the method for resource reservation according to the first embodiment or the second embodiment of the present disclosure.

As shown in FIG. 5, for the SA information from UE1, UE2 is instructed according to the mode (4) in step 201, the occupation period for the time-frequency resource is represented by T_p=100 ms, the location information of the time-frequency resource is represented by R, and the current remaining actual quantity of the time-frequency resources being persistently occupied is represented by N2=5. It is assumed that the maximum valid quantity of the time-frequency resource for UE1 is represented by N3=2, UE2 determines N1=2.

The remaining quantity of transmissions for UE1 before time Ta is 5. It is assumed that UE1 is out of the communication range of UE2 at the time Ta, and UE2 cannot receive the SA information transmitted by UE1 subsequently. As can be known according to N1, UE2 believes that UE1 may still occupy the current time-frequency resource in the subsequent two periods for the time-frequency resource at the time Ta, that is, the current time-frequency resource R may be occupied by UE1 before time Tb. Before the time Tb, that is, in the subsequent two periods for the time-frequency resource after the time Ta, if the SA information transmitted by UE1 is not received, UE2 determines that the time-frequency resource is idle after the time Tb.

Figure 6:
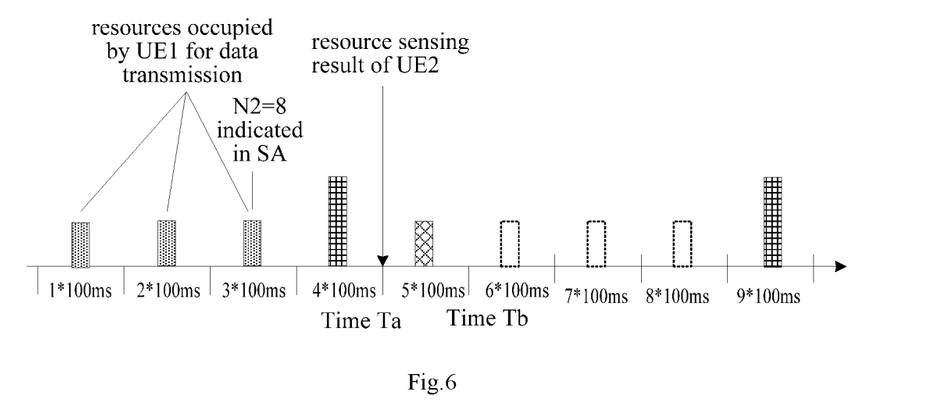
Figure 7:
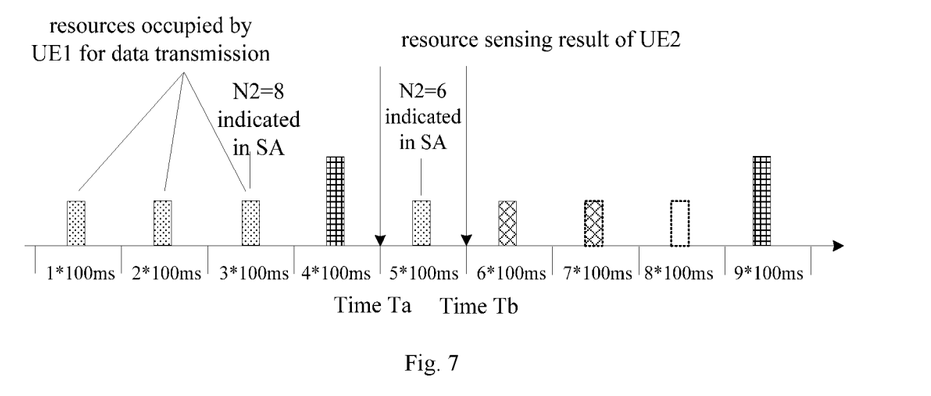

As shown in FIG. 6 and FIG. 7, for the SA information of UE1, UE2 is instructed according to the mode (4) in step 201, the occupation period for the small packet time-frequency resource is represented by T_p1=100 ms, the occupation period for the large packet time-frequency resource is represented by T_p2=500 ms, the location information of the time-frequency resource is represented by R, and the current remaining actual quantity of the time-frequency resources being persistently occupied is represented by N2=8. UE2 may determine N1=2 according to the maximum valid quantity of the time-frequency resource N3=2.

It is assumed that UE2 does not receive the occupation information about the small packet resource within 100 ms in one period for the time-frequency resource before the time Ta. As shown in FIG. 6, the remaining quantity of the small packet time-frequency resource being persistently occupied at the time Ta is 1, and then the small packet time-frequency resource is still identified to be occupied within the next 100 ms after the time Ta. At the time Tb, UE2 receives new SA information for indicating the occupation status of the small packet resource, and the SA indicates N2=6, as shown in FIG. 7. In this case, the maximum valid quantity of the time-frequency resource for UE1 is at least required to be N3>=2, otherwise a resource conflict may occur in the first T_p1 after the time Ta.

Figure 8:
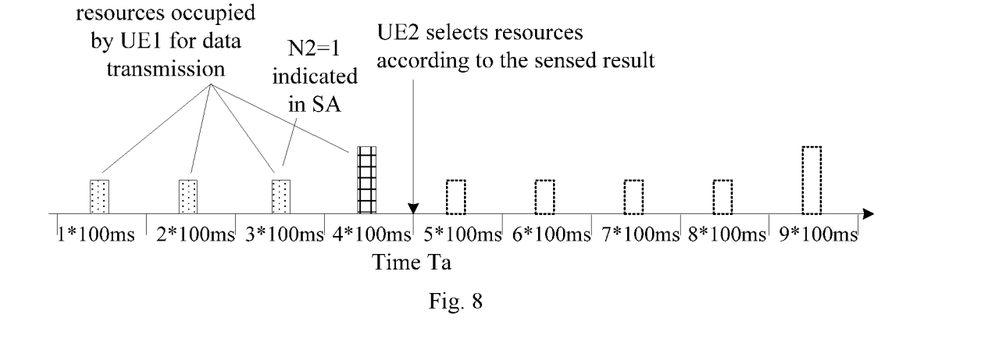

As shown in FIG. 8, in the SA of UE1, the occupation period for the small packet time-frequency resource is represented by T_p1=100 ms, the occupation period for the large packet time-frequency resource is represented by T_p2=500 ms, the location information of the time-frequency resource is represented by R, and the current remaining actual quantity of the time-frequency resources being persistently occupied is represented by N2=1. If UE2 receives SA information for indicating the occupation status of the small packet resource within 200 ms of two periods for the time-frequency resource before the time Ta, and the remaining valid quantity of transmissions is 1, i.e., N1=1, and UE2 determines that all the small packet resources at the current time are idle at the time Ta.

Figure 9:
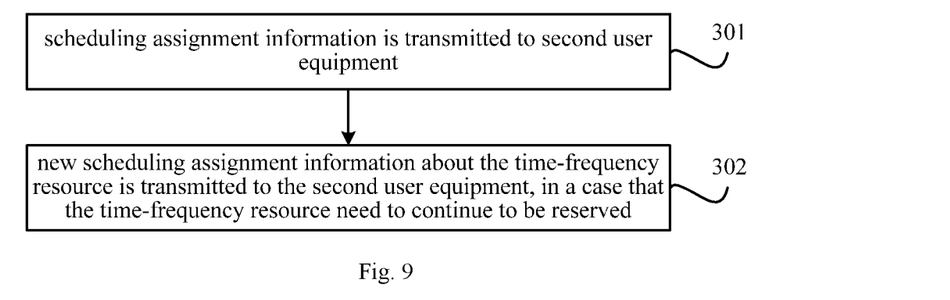
FIG. 9 is a flowchart of a method for resource reservation according to a third embodiment of the present disclosure.

As shown in FIG. 9, a method for resource reservation is provided according to a third embodiment of the present disclosure, which is applicable to first user equipment, and includes the following steps 301 to 302.

In step 301, scheduling assignment information is transmitted to second user equipment.

In a specific application, the information included in the scheduling assignment information may include the following cases:

(1) information about the time-frequency resource that the first user equipment needs to reserve;

(2) information about the time-frequency resource that the first user equipment needs to reserve, and an occupation period for the time-frequency resource;

(3) information about the time-frequency resource that the first user equipment needs to reserve, and the current remaining actual quantity of the time-frequency resource being persistently occupied;

(4) information about the time-frequency resource that the first user equipment needs to reserve, an occupation period for the time-frequency resource, and the current remaining actual quantity of the time-frequency resource being persistently occupied;

(5) information about the time-frequency resource that the first user equipment needs to reserve, the current remaining valid quantity of the time-frequency resource being persistently occupied, and an occupation period for the time-frequency resource.

In step 302, new scheduling assignment information about the time-frequency resource is transmitted to the second user equipment, in a case that the time-frequency resource need to continue to be reserved.

In this case, the second user equipment may determine the occupation status of the time-frequency resource reserved by the first user equipment according to the received new scheduling assignment information.

Specifically, if the new scheduling assignment information about the time-frequency resource transmitted by the first user equipment has been received by the second user equipment before the quantity of reservations determined by the second user equipment becomes invalid, the reservation information for the time-frequency resource is re-determined according to the new scheduling assignment information; and if no new scheduling assignment information about the time-frequency resource transmitted by the first user equipment has been received by the second user equipment before the quantity of reservations becomes invalid, the time-frequency resource is taken as an idle resource.

The current remaining actual quantity of the time-frequency resource being persistently occupied decreases as the number of times that the time-frequency resource has been used to transmit data increases. For example, after the SA information is transmitted in step 301, if the SA information further needs to be transmitted in step 302, the current remaining actual quantity of the time-frequency resource being persistently occupied included in the SA information in step 302 is equal to a value of the current remaining actual quantity of the time-frequency resource being persistently occupied included in the SA in step 301 minus the quantity of transmitting data using the time-frequency resource.

The current remaining valid quantity of the time-frequency resource being persistently occupied is the smaller one of the current remaining actual quantity of the time-frequency resource being persistently occupied and the preset maximum valid quantity of the time-frequency resource, and the preset maximum valid quantity of the time-frequency resource is an integer greater than or equal to 2.

As can be seen from the above, in the embodiment of the present disclosure, after receiving the scheduling assignment information from the first user equipment, the second user equipment determines the quantity of reservations for the time-frequency resource by the first user equipment according to the scheduling assignment information, and determines whether the time-frequency resource reserved by the first user equipment may be utilized according to whether the new scheduling assignment information of the first user equipment is received before the quantity of reservations becomes invalid. Therefore, with the solutions in the embodiments of the present disclosure, the occupation status of the reserved resources by the first user equipment can be known in time, so that the reserved resources are processed correspondingly, thereby avoiding the false alarm and misjudgment of the reserved resources, and improving the efficiency of resource allocation.

Figure 10:
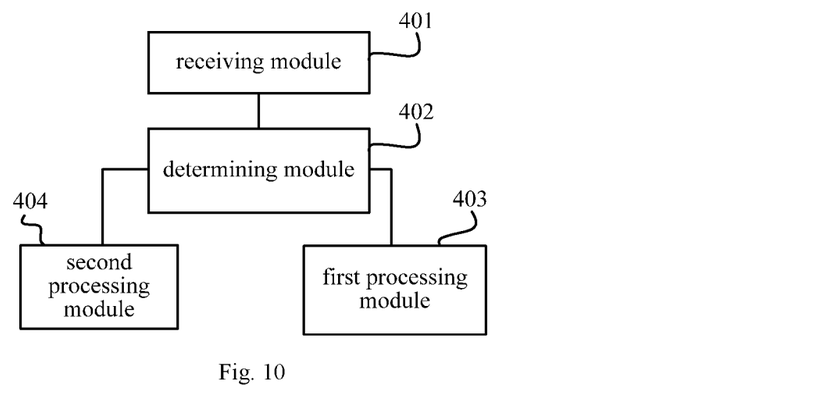
FIG. 10 is a schematic diagram of a device for resource reservation according to a fourth embodiment of the present disclosure.

As shown in FIG. 10, a device for resource reservation is further provided according to a fourth embodiment of the present disclosure, which includes:

a receiving module 401, configured to receive scheduling assignment information transmitted by first user equipment, where the scheduling assignment information includes information about a time-frequency resource that the first user equipment needs to reserve;

a determining module 402, configured to determine the quantity of reservations for the time-frequency resource by the first user equipment according to the scheduling assignment information;

a first processing module 403, configured to if new scheduling assignment information about the time-frequency resource transmitted by the first user equipment has been received before the quantity of reservations becomes invalid, re-determine reservation information for the time-frequency resource according to the new scheduling assignment information; and a second processing module 404, configured to if no new scheduling assignment information about the time-frequency resource transmitted by the first user equipment has been received before the quantity of reservations becomes invalid, take the time-frequency resource as an idle resource.

The scheduling assignment information further includes: an occupation period for the time-frequency resource; or the scheduling assignment information further includes: the current remaining actual quantity of the time-frequency resource being persistently occupied; or the scheduling assignment information further includes: the current remaining actual quantity of the time-frequency resource being persistently occupied, and an occupation period for the time-frequency resource; or the scheduling assignment information further includes: the current remaining valid quantity of the time-frequency resource being persistently occupied, and an occupation period for the time-frequency resource.

The determining module 402 is specifically configured to:

determine the preset maximum valid quantity of the time-frequency resource according to the scheduling assignment information, and take the maximum valid quantity of the time-frequency resource as the quantity of reservations, where the maximum valid quantity of the time-frequency resource is an integer equal to or greater than 2.

The determining module 402 includes:

a first determining sub-module, configured to determine the preset maximum valid quantity of the time-frequency resource according to the scheduling assignment information; and a second determining sub-module, configured to determine the smaller one of the maximum valid quantity of the time-frequency resource and the current remaining actual quantity of the time-frequency resource being persistently occupied as the quantity of reservations of the time-frequency resource, where the maximum valid quantity of the time-frequency resource is an integer equal to or greater than 2.

Specifically, the determining module 402 is configured to:

take the current remaining valid quantity of the time-frequency resource being persistently occupied as the quantity of reservations of the time-frequency resource, where the current remaining valid quantity of the time-frequency resource being persistently occupied is the smaller one of the preset maximum valid quantity of the time-frequency resource and the current remaining actual quantity of the time-frequency resource being persistently occupied which is determined by the first user equipment, and the preset maximum valid quantity of the time-frequency resource is an integer equal to or greater than 2.

Specifically, the second determining sub-module is configured to: if the number of times that the new scheduling assignment information about the time-frequency resource transmitted by the first user equipment being not received successively reaches the quantity of reservations, take the time-frequency resource as an idle resource.

The information about time-frequency resource that the first user equipment needs to reserve includes location information of the time-frequency resource. Powers of receiving scheduling assignment information and receiving new scheduling assignment information are greater than or equal to a preset value.

For the operating principle of the device according to the present disclosure, reference may be made to the description in the foregoing method embodiments, and the device may be arranged in a removable terminal.

As can be seen from the above, in the embodiments of the present disclosure, after the scheduling assignment information of the first user equipment is received, the quantity of reservations for the time-frequency resource by the first user equipment is determined according to the scheduling assignment information, and it is determined whether the time-frequency resource reserved by the first user equipment may be utilized according to whether the new scheduling assignment information of the first user equipment is received before the quantity of reservations becomes invalid. Therefore, with the solutions in the embodiments of the present disclosure, the occupation status of the reserved resources by the first user equipment can be known in time, so that the reserved resources are processed correspondingly, thereby avoiding the false alarms and misjudgment of the reserved resources, and improving the efficiency of resource allocation.

Figure 11:
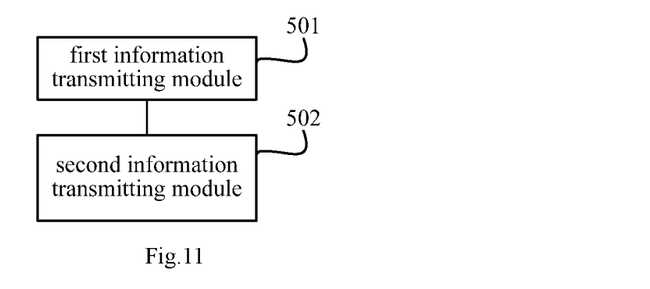
FIG. 11 is a schematic diagram of a device for resource reservation according to a fifth embodiment of the present disclosure.

As shown in FIG. 11, a device for resource reservation is further provided according to a fifth embodiment of the present disclosure, which includes:

a first information transmitting module 501, configured to transmit scheduling assignment information to second user equipment, where the scheduling assignment information includes information about a time-frequency resource to be reserved; and a second information transmitting module 502, configured to transmit new scheduling assignment information about the time-frequency resource to the second user equipment, when the time-frequency resource need to continue to be reserved.

Figure 12:
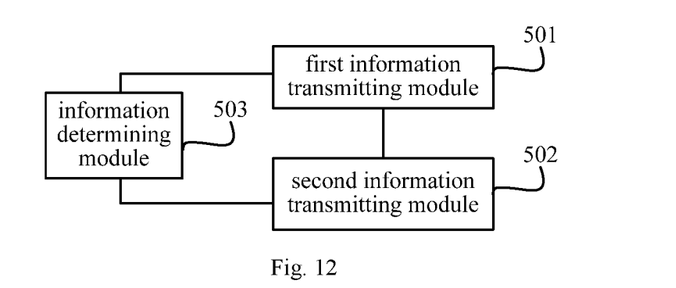
FIG. 12 is another schematic diagram of a device for resource reservation according to the fifth embodiment of the present disclosure.

As shown in FIG. 12, the device further includes: an information determining module 503, configured to determine content included in the scheduling assignment information. On the basis of including the information about the time-frequency resource to be reserved, the scheduling assignment information further includes: an occupation period for the time-frequency resource; or the scheduling assignment information further includes: the current remaining actual quantity of the time-frequency resource being persistently occupied; or the scheduling assignment information further includes: the current remaining actual quantity of the time-frequency resource being persistently occupied, and an occupation period for the time-frequency resource; or the scheduling assignment information further includes: the current remaining valid quantity of the time-frequency resource being persistently occupied, and an occupation period for the time-frequency resource.

The current remaining actual quantity of the time-frequency resource being persistently occupied decreases as the number of times that the time-frequency resource has been used for data transmission increases.

In determining the current remaining valid quantity of the time-frequency resource being persistently occupied, the information determining module 503 is specifically configured to take the smaller one of the current remaining actual quantity of the time-frequency resource being persistently occupied and the preset maximum valid quantity of the time-frequency resource as the current remaining valid quantity of the time-frequency resource being persistently occupied, where the preset maximum valid quantity of the time-frequency resource is an integer greater than 1.

For the operating principle of the device according to the present disclosure, reference may be made to the description in the foregoing method embodiments, and the device may be arranged in a removable terminal.

As can be seen from the above, in the embodiments of the present disclosure, after receiving the scheduling assignment information of the first user equipment, the second user equipment determines the quantity of reservations for the time-frequency resource by the first user equipment according to the scheduling assignment information, and determines whether the time-frequency resource reserved by the first user equipment may be utilized according to whether the new scheduling assignment information of the first user equipment is received before the quantity of reservations becomes invalid. Therefore, with the solutions in the embodiments of the present disclosure, the occupation status of the reserved resources by the first user equipment can be known in time, so that the reserved resources are processed correspondingly, thereby avoiding the false alarms and misjudgment of the reserved resources, and improving the efficiency of resource allocation.

A device for resource reservation is further provided according to a sixth embodiment of the present disclosure, which includes a receiver, a processor, and a memory for storing programs and data used by the processor in performing operations. The processor implements the functions of the following functional modules or units, when calling and executing the programs and data stored in the memory:

a receiving module, configured to receive scheduling assignment information transmitted by first user equipment, where the scheduling assignment information includes information about a time-frequency resource that the first user equipment needs to reserve;

a determining module, configured to determine the quantity of reservations for the time-frequency resource by the first user equipment according to the scheduling assignment information;

a first processing module, configured to if new scheduling assignment information about the time-frequency resource transmitted by the first user equipment has been received before the quantity of reservations becomes invalid, re-determine reservation information for the time-frequency resource according to the new scheduling assignment information; and a second processing module, configured to if no new scheduling assignment information about the time-frequency resource transmitted by the first user equipment has been received before the quantity of reservations becomes invalid, take the time-frequency resource as an idle resource.

Figure 13:
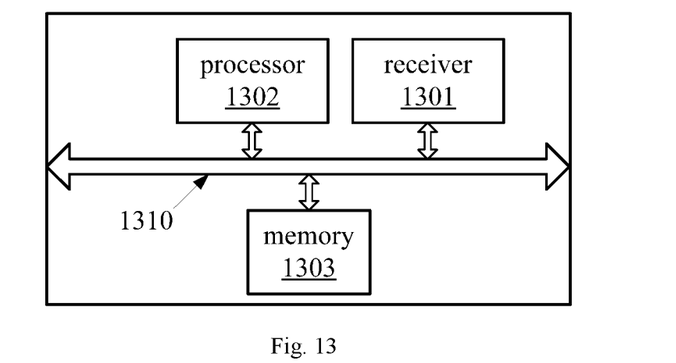
FIG. 13 is a schematic diagram of a device for resource reservation according to at least one embodiment of the present disclosure.

Illustratively, referring to FIG. 13, a device for resource reservation 1300 may be applicable to second user equipment, and includes a receiver 1301, a processor 1302, and a memory 1303 for storing data used by the processor 1302 in performing operations. The memory 1303 may include a read-only memory or a random access memory, and provide instructions and data to the processor 1302. A portion of the memory 1303 may include an NVRAM (Non Volatile Random Access Memory). The receiver 1301, the processor 1302 and the memory 1303 are coupled together via a bus system 1010. The bus system 1310 includes a power bus, a control bus, and a status signal bus in addition to the data bus. However, for the sake of the clear description, various buses are labeled as the bus system 1310 in the FIG. 13.

In the embodiment, the receiver 1301 is configured to receive scheduling assignment information transmitted by first user equipment, where the scheduling assignment information includes information about a time-frequency resource that the first user equipment needs to reserve. The processor 1302 is configured to determine the quantity of reservations for the time-frequency resource by the first user equipment according to the scheduling assignment information received by the receiver 1301; if new scheduling assignment information about the time-frequency resource transmitted by the first user equipment has been received before the quantity of reservations becomes invalid, re-determine reservation information for the time-frequency resource according to the new scheduling assignment information; and if no new scheduling assignment information about the time-frequency resource transmitted by the first user equipment has been received before the quantity of reservations becomes invalid, take the time-frequency resource as an idle resource.

A device for resource reservation is further provided according to a seventh embodiment of the present disclosure, which includes a transmitter, a processor, and a memory for storing programs and data used by the processor in performing operations. The processor implements functions of the following functional modules or units, when calling and executing the programs and data stored in the memory:

a first information transmitting module, configured to transmit scheduling assignment information to second user equipment, where the scheduling assignment information includes information about a time-frequency resource to be reserved; and a second information transmitting module, configured to transmit new scheduling assignment information about the time-frequency resource to the second user equipment, when the time-frequency resource need to continue to be reserved.

Figure 14:
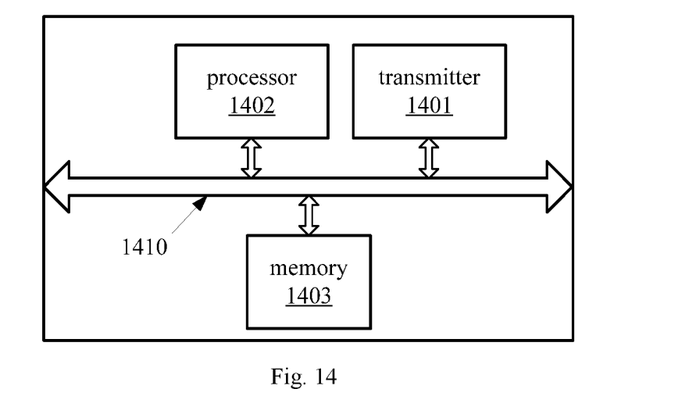
FIG. 14 is a schematic diagram of a device for resource reservation according to at least one embodiment of the present disclosure.

Illustratively, referring to FIG. 14, a resource reservation device 1400 is applicable to first user equipment, and includes a transmitter 1401, a processor 1402, and a memory 1403 for storing data used by the processor 1402 in performing operations. The memory 1403 may include a read-only memory or a random access memory and provide instructions and data to the processor 1402. A portion of the memory 1403 may include an NVRAM (Non Volatile Random Access Memory). The transmitter 1401, the processor 1402, and the memory 1403 are coupled together via a bus system 1410. The bus system 1410 includes a power bus, a control bus, and a status signal bus in addition to the data bus. However, for the sake of the clear description, various buses are labeled as the bus system 1410 in the FIG. 14.

In the embodiment, the transmitter 1401 is configured to transmit scheduling assignment information to second user equipment, the scheduling assignment information including information about a time-frequency resource to be reserved; transmit new scheduling assignment information about the time-frequency resource to the second user equipment, when it is determined by the processor 1402 that the time-frequency resource need to continue to be reserved.

It should be noted that the devices according to the sixth embodiment and the seventh embodiment of the present disclosure each is a device capable of implementing the method for resource reservation according to the foregoing method embodiments, and therefore all embodiments of method for resource reservation according to the foregoing method embodiments may be applicable to the sixth embodiment and the seventh embodiment correspondingly, with the same or similar benefits being achieved.

It should be understood that, in the embodiments according to the present application, the disclosed method and device may be implemented in other manners. The above-mentioned embodiments of the device according to the present disclosure are only illustrative. For example, the division in units is only a logical division of functions and other kinds of division are possible in practice. For example, multiple units or components may be combined together or may be integrated in another system; or some features may be omitted or not implemented. Furthermore, the coupling, directly coupling or communication connection between the components shown or discussed may be indirectly coupling or communication connection between devices or units via some interfaces and may be electrical, mechanical or in other form.

Furthermore, the functional units in the embodiments of the present disclosure may be all integrated in a processing unit; the functional units may be each operates as a physical unit; or two or more of the functional units may be integrated in a unit. The integrated unit may be implemented in the form of hardware or in the form of hardware together with software.

The above integrated unit which is implemented in the form of the software function units may be stored in a computer readable storage medium. The software function units are stored in a storage medium and include multiple instructions for instructing a computer device (which may be a personal computer, a server, a network equipment or the like) to perform all or part of the methods described in the embodiments of the present disclosure. The storage medium may include any medium which is capable of storing program codes, such as a U disk, a removable hard disk, a read-only memory (ROM), a random access memory (RAM), a magnetic disk or an optical disk.

The above embodiments are preferred embodiments of the present disclosure. It should be noted that numerous improvements and modifications may be made by those skilled in the art without departing from the principle of the present disclosure, and these improvements and modifications shall also fall within the scope of the present disclosure.

What is claimed is:

1. A method for resource reservation, comprising:
receiving scheduling assignment information transmitted by a first user equipment (UE), wherein the scheduling assignment information comprises information about a time-frequency resource that the first UE requires to reserve;
determining the quantity of reservations for the time-frequency resource by the first UE according to the scheduling assignment information;
re-determining reservation information for the time-frequency resource according to new scheduling assignment information, if the new scheduling assignment information about the time-frequency resource transmitted by the first UE has been received before the quantity of reservations becomes invalid; and
taking the time-frequency resource as an idle resource, if no new scheduling assignment information about the time-frequency resource transmitted by the first UE has been received before the quantity of reservations becomes invalid,
wherein the scheduling assignment information further comprises: an occupation period for the time-frequency resource, and the quantity of reservations for the time-frequency resource is equal to a quotient obtained after a preset maximum valid duration of the time-frequency resource is divided by the occupation period for the time-frequency resource; or
the scheduling assignment information further comprises: the current remaining actual quantity of the time-frequency resource being persistently occupied; or
the scheduling assignment information further comprises: the current remaining actual quantity of the time-frequency resource being persistently occupied, and an occupation period for the time-frequency resource; or
the scheduling assignment information further comprises: the current remaining valid quantity of the time-frequency resource being persistently occupied, and an occupation period for the time-frequency resource.

2. The method according to claim 1, wherein the determining the quantity of reservations for the time-frequency resource by the first UE according to the scheduling assignment information comprises:
determining the preset maximum valid quantity of the time-frequency resource according to the scheduling assignment information, and taking the maximum valid quantity of the time-frequency resource as the quantity of reservations, wherein the maximum valid quantity of the time-frequency resource is an integer greater than 1.

3. The method according to claim 1, wherein the determining the quantity of reservations for the time-frequency resource by the first UE according to the scheduling assignment information comprises:
taking the current remaining valid quantity of the time-frequency resource being persistently occupied as the quantity of reservations of the time-frequency resource; or
determining the preset maximum valid quantity of the time-frequency resource according to the scheduling assignment information, and determining the smaller one of the maximum valid quantity of the time-frequency resource and the current remaining actual quantity of the time-frequency resource being persistently occupied as the quantity of reservations of the time-frequency resource, wherein the maximum valid quantity of the time-frequency resource is an integer greater than 1.

4. The method according to claim 1, wherein if no new scheduling assignment information about the time-frequency resource transmitted by the first UE has been received before the quantity of reservations becomes invalid, the taking the time-frequency resource as an idle resource, specifically comprises:
taking the time-frequency resource as the idle resource, if the quantity of the new scheduling assignment information about the time-frequency resource transmitted by the first UE being not received successively reaches the quantity of reservations.

5. The method according to claim 1, wherein a received power of the scheduling assignment information and a received power of the new scheduling assignment information are greater than or equal to a preset value.

6. A method for resource reservation, comprising:
transmitting scheduling assignment information to a second UE, wherein the scheduling assignment information comprises information about a time-frequency resource to be reserved; and
transmitting new scheduling assignment information about the time-frequency resource to the second UE, in a case that the time-frequency resource requires to continue to be reserved,
wherein the scheduling assignment information further comprises: an occupation period for the time-frequency resource, and the quantity of reservations for the time-frequency resource is equal to a quotient obtained after a preset maximum valid duration of the time-frequency resource is divided by the occupation period for the time-frequency resource; or
the scheduling assignment information further comprises: the current remaining actual quantity of the time-frequency resource being persistently occupied; or
the scheduling assignment information further comprises: the current remaining actual quantity of the time-frequency resource being persistently occupied, and an occupation period for the time-frequency resource; or
the scheduling assignment information further comprises: the current remaining valid quantity of the time-frequency resource being persistently occupied, and an occupation period for the time-frequency resource.

7. The method according to claim 6, wherein the current remaining actual quantity of the time-frequency resource being persistently occupied decreases as the number of times that the time-frequency resource has been used for data transmission increases.

8. The method according to claim 6, wherein the current remaining valid quantity of the time-frequency resource being persistently occupied is the smaller one of the current remaining actual quantity of the time-frequency resource being persistently occupied and the preset maximum valid quantity of the time-frequency resource, and the preset maximum valid quantity of the time-frequency resource is an integer greater than 1.

9. A device for resource reservation, comprising:
a receiver, a processor, and a memory configured to store a computer program used by the processor in performing operations,
wherein the processor is configured to execute the computer program to perform steps in the method for resource reservation according to claim 1.

10. The device according to claim 9, wherein the processor is specifically configured to:
determine the preset maximum valid quantity of the time-frequency resource according to the scheduling assignment information, and take the maximum valid quantity of the time-frequency resource as the quantity of reservations, wherein the maximum valid quantity of the time-frequency resource is an integer greater than 1.

11. The device according to claim 9, wherein the processor is further configured to:
take the current remaining valid quantity of the time-frequency resource being persistently occupied as the quantity of reservations of the time-frequency resource; or
determine the preset maximum valid quantity of the time-frequency resource according to the scheduling assignment information, and determine the smaller one of the maximum valid quantity of the time-frequency resource and the current remaining actual quantity of the time-frequency resource being persistently occupied as the quantity of reservations of the time-frequency resource, wherein the maximum valid quantity of the time-frequency resource is an integer greater than 1.

12. The device according to claim 9, wherein the processor is specifically configured to take the time-frequency resource as the idle resource, if the quantity of the new scheduling assignment information about the time-frequency resource transmitted by the first UE being not received successively reaches the quantity of reservations.

13. The device according to claim 9, wherein
a received power of the scheduling assignment information and a received power of the new scheduling assignment information are greater than or equal to a preset value.

14. A device for resource reservation, configured to perform the method for resource reservation according to claim 6, comprising: a transmitter, a processor, and a memory configured to store data used by the processor in performing operations,
wherein the transmitter is configured to transmit scheduling assignment information to the second UE, wherein the scheduling assignment information comprises information about the time-frequency resource to be reserved; and transmit new scheduling assignment information about the time-frequency resource to the second UE, when it is determined by the processor that the time-frequency resource requires to continue to be reserved.

15. The device according to claim 14, wherein the current remaining actual quantity of the time-frequency resource being persistently occupied decreases as the number of times that the time-frequency resource has been used for data transmission increases.

16. The device according to claim 14, wherein the processor is specifically configured to:
take the smaller one of the current remaining actual quantity of the time-frequency resource being persistently occupied and the preset maximum valid quantity of the time-frequency resource as the current remaining valid quantity of the time-frequency resource being persistently occupied, wherein the preset maximum valid quantity of the time-frequency resource is an integer greater than 1.

17. The method according to claim 1, wherein the information about time-frequency resource that the first UE requires to reserve comprises location information about the time-frequency resource.

18. A method for resource reservation, comprising:
receiving scheduling assignment information transmitted by a first user equipment (UE), wherein the scheduling assignment information comprises information about a time-frequency resource that the first UE requires to reserve;
determining the quantity of reservations for the time-frequency resource by the first UE according to the scheduling assignment information;
re-determining reservation information for the time-frequency resource according to new scheduling assignment information, if the new scheduling assignment information about the time-frequency resource transmitted by the first UE has been received before the quantity of reservations becomes invalid; and
taking the time-frequency resource as an idle resource, if no new scheduling assignment information about the time-frequency resource transmitted by the first UE has been received before the quantity of reservations becomes invalid,
wherein if no new scheduling assignment information about the time-frequency resource transmitted by the first UE has been received before the quantity of reservations becomes invalid, the taking the time-frequency resource as an idle resource, specifically comprises:
taking the time-frequency resource as the idle resource, if the quantity of the new scheduling assignment information about the time-frequency resource transmitted by the first UE being not received successively reaches the quantity of reservations.

* * * * *